United States Patent [19]

Reinis

[11] 3,793,017

[45] Feb. 19, 1974

[54] IMAGE FIXING METHOD

[76] Inventor: Gedeminas J. Reinis, 56 Woodhaven Dr., Rochester, N.Y. 14625

[22] Filed: Oct. 27, 1972

[21] Appl. No.: 301,563

[52] U.S. Cl. .......................................... 96/1 M, 96/28

[51] Int. Cl. ......................... G03g 13/00, G03g 13/04

[58] Field of Search ......................... 96/1 R, 1 M, 28

[56] References Cited

UNITED STATES PATENTS

| | | | |
|---|---|---|---|
| 3,723,112 | 3/1973 | Trubbs, Jr. | 96/1.2 |
| 3,573,904 | 4/1971 | Clark | 96/1 R |

*Primary Examiner*—J. Travis Brown
*Assistant Examiner*—J. P. Brammer

[57] ABSTRACT

This invention pertains to an imaging system wherein there is employed a structure comprising a cohesively weak electrically photosensitive imaging layer sandwiched between a donor sheet and a receiver sheet. The imaging layer is rendered structurally fracturable by treating the layer with an activator. After exposing the imaging layer to actinic electromagnetic radiation while the imaging layer subjected to an electric field, the sandwich is separated whereby the imaging layer fractures with the exposed portions of the imaging layer residing on one of the sheets and the unexposed portion residing on the other sheet. Images are produced in accordance with the present invention which are highly fixed to their substrates by employing in the imaging process an activator which is or contains an unsaturated hydrocarbon component that can be easily oxidized to form a protective coating in and on the image produced by the imaging process.

15 Claims, 2 Drawing Figures

IMAGE FIXING METHOD

BACKGROUND OF THE INVENTION

The present invention relates to a layer transfer imaging process more generally known as the manifold imaging process. More particularly the invention relates to a method whereby images produced by the manifold imaging process are securely fixed to their substrates.

There has been discovered an imaging technique based on layer transfer of material from a donor sheet to a receiver sheet under the influence of an applied electric field and electromagnetic radiation. A more comprehensive discussion of the imaging technique of layer transfer may be found in copending application Ser. No. 708,380 filed Feb. 26, 1968 in the U. S. Pat. Office, and now U.S. Pat. No. 3,707,368.

Copending application Ser. No. 708,380 describes an imaging system utilizing a manifold sandwich comprising an electrically photosensitive material between a pair of sheets. In this imaging system an imaging layer is prepared by coating a layer of electrically photosensitive imaging material onto a substrate. In one form the imaging layer comprises a photosensitive material comprising metal-free phthalocyanine dispersed in a cohesively weak insulating binder. This coated substrate is called the donor. When needed the imaging layer is rendered cohesively weak. This process step is termed activation and in most cases the imaging layer is activated by contacting it with a swelling agent, softening agent solvent or partial solvent for the imaging layer or by heating. After activation a receiver sheet is layed over the surface of the imaging layer. An electrical field is then applied across this manifold sandwich while it is exposed to a pattern of light and shadow representative of the image to be reproduced. Upon separation of the donor substrate or sheet and receiver sheet the imaging layer fractures along the line defined by the pattern of light and shadow to which the imaging layer has been exposed. Part of the imaging layer is transferred to one of the sheets while the remainder is retained on the other sheet so that a positive image, that is, a duplicate of the original is produced on one sheet and a negative image is produced on the other.

After the image is formed the image is usually fixed as by fusing the image material onto the substrate by means of heat. Other means of fixing the image have been employed such as by overcoating the image with a clear plastic film and then drying the film. Also, images have been fixed by incorporating polymers dispersed or dissolved in the activator which is sprayed onto the image material and subsequently fused such as in copending application Ser. No. 53,750 filed July 10, 1970 in the U.S. Pat. Office, and now U.S. Pat. No. 3,723,112. Other examples of the manifold imaging process may be found in U. S. Pat. Nos. 3,642,363 to Davidson; 3,556,783 to Kyriakakis; U. S. Pat. Nos. 3,512,968 to Tulagin; 3,615,393 to Krohn et al. and 3,653,889 to Luebbe et al. which describes another method of fixing manifold images.

Although the manifold imaging method produces images useful in many different ways as indicated by the patents cited above, in some instances images having a high degree of fixing are desired. In addition, this fixing should not entail the use of extra equipment or additional steps in the imaging process. Furthermore, the manifold imaging member may desirably be preactivated such that the activation step need not take place during the imaging process. In such instances low boiling activators have been employed. However such activators are not conveniently removed from the image after its formation. Removal of the activator is normally desired so that the image can be easily fixed to the substrate. Thus a low boiling activator which does not adversely affect the fixing of the image is desired.

SUMMARY OF THE INVENTION

It is, therefore, an object of this invention to provide an imaging system overcoming the above noted disadvantages.

It is another object of this invention to provide a layer transfer imaging system which provides comparatively durable images.

It is another object of this invention to provide a manifold imaging process wherein the images are well fixed easily and quickly after their formation by employing a dual purpose activator which both renders the imaging layer properly fracturable and fixes the image to its substrate.

In accordance with this invention the manifold imaging process is practiced by employing an activator having at least one component which is a hydrocarbon having a concentration of reactive unsaturated sites. These sites, after image formation, can be oxidized to form a film in or on the image thus fixing it to the substrate. The phenomenon of film formation or fixing is believed to involve the process of oxidative polymerization similar to that believed to exist in drying oils.

Typical hydrocarbon materials suitable are unsaturated non-hydroxylated siccative oils such as linseed oil, hempseed oil and walnut seed oil; all oils of the linseed class; perilla oil which is typical of the oils of the perilla class; semi-drying vegetable oils such as soybean and sunflower oil. These and other polyene materials have been employed in the paint industry. Other typical materials are described in U.S. Pat. No. 1,968,244 to Egge et al. and U. S. Pat. No. 2,358,623 to Burr.

Such materials can be employed in the above noted manifold imaging process as the activator or as a component of an activator. As is well known in the manifold imaging art, the material employed as the activator reduces the cohesive strength of the imaging layer. That is, the layer must be sufficiently weak structurally so that the application of the electrical field combined with the action of actinic radiation on the electrically photosensitive materials will upon sandwich separation fracture the imaging layer. Further, the layer must repond to the application of a field the strength of which is below that field strength which will cause electrical breakdown or arking across the imaging layer. Another term for "cohesively weak," therefore, would be "field fracturable."

DETAILED DESCRIPTION OF THE INVENTION

As explained above, the activation step in the manifold imaging process is employed in order to render the imaging layer cohesively weak or structurally fracturable in response to the combined effects of an electrical field and electromagnetic radiation to which the imaging layer is sensitive. Preferably, the activator should have a high resistivity so as to prevent electrical breakdown of the manifold sandwich. Accordingly, it will generally be found to be desirable to purify commerical grades of activators so as to remove the impurities which might impart a higher level of conductivity. The use of a clay column or other means of purification is suggested. As is known in the art the activator is understood to include not only materials which are conventionally termed solvents but also those which are partial solvents, swelling agents or softening agents for the imaging layer. Accordingly the unsaturated hydrocarbons of this invention are employed wherein the material comprising the imaging layer is such that the hydrocarbons will reduce its cohesive strength to the necessary point as described above. In those instances wherein the imaging layer comprises materials not so weakened by the hydrocarbons of this invention, the reactive unsaturated hydrocarbons may be included by suspension, solution or otherwise in another activator which so performs the necessary functions of an activator. The activator has been generally preferred to have a relative boiling point so that the activator is easily removed after image formation. In accordance with this invention the unsaturated hydrocarbon employed as or with the activator is not removed but is treated so as to cause oxidation of the unsaturated sites thereby causing the formation of a protective film over the image. The unsaturated hydrocarbon materials of this invention are easily oxidized by exposure to heat. Normally the hydrocarbon is heated to from about 50° C – 100° C but heat operation is determined by the desired speed of fixing and materials employed. In some instances exposure to the atmosphere will be sufficient to cause film formation but is not preferred due to the time required.

The protective film produced in accordance with this invention provides a flexible, clear, scratch resistance protective cover for the image.

One of the major advantages of the manifold imaging process is the transferability of the images produced thereby. Manifold images can be transferred to a wide variety of substrates by techniques described in U. S. Pat. No. 3,658,519 to Menz and copending applications Ser. Nos. 809,328 now U.S. Pat. No. 3,708,289 and 887,807 now U.S. Pat. No. 3,671,390 filed Mar. 21, 1969 and Dec. 24, 1969 respectively all of which are hereby incorporated by reference. In accordance with this invention the images produced can be transferred from the donor or receiver sheet to a different substrate prior to oxidization of the unsaturated hydrocarbon fixative. The transferred image is thus easily fixed to the final substrate as described above.

The usual procedures employed in the manifold imaging art are practiced in concert with the activator employed in accordance with this invention. Thus the electrical field is applied by the usual means as in known in the art. The electrically photosensitive materials are well known and need no special treatment for use in the process of this invention. Organic electrically photosensitive materials are preferred because of their color and availability although inorganic materials can be employed. The *x*-form phthalocyanine is preferred because of its excellent photosensitivity although any suitable form of phthalocyanine can be employed.

The binder material in the heterogeneous imaging layer may be any material which can be rendered cohesively weak by the hydrocarbons of this invention or by the conventional activators. Of course, the binder material is coordinated with the activator so as to produce the frangible or structurally fracturable condition required of the imaging layer. Typical binders such as the microcrystalline waxes, polyethylenes, polystyrenes and modified polystyrenes, styrene-vinyltoluene copolymers and polypropylenes are suitable as well as mixtures thereof. Examples of the above are paraffin waxes such as Sunoco 5512 from the Sun Oil Company; microcrystalline waxes such as Paraflint R. G. from the Moore and Munger Company; polyethylenes such as Union Carbides DYJT, DYLT and DYDT; modified styrenes such as Pennsylvania Industrial Chemicals Piccotex 75, 100 and 120 and resins such as E. I. duPont de Nemours and Co. Inc. Elvax resins 210, 310 and 420.

The typical activators of the prior art are employed in conjunction with the unsaturated hydrocarbon activator/fixatives of this invention. Such activators include Sohio Odorless Solvent 3440, an aliphatic (kerosene) hydrocarbon fraction available from The Standard Oil Co., petroleum ether, halogenated hydrocarbons such as chloroform, methylene chloride, trichlorothylene, perchloro-ethylene; ethers such as diethyl ether and diisopropyl ether.

Other suitable materials useful in the manifold imaging process of this invention including donor and receiver sheets, electrically photosensitive materials, binders and activators are found in copending application Ser. No. 708,380 mentioned above all of which is incorporated herein by reference. A particularly preferred method of activating and preferred activators are thermosolvents as described in my U. S. Pat. No. 3,598,581 also incorporated herein by reference. In one embodiment of this invention, the thermosolvent, preferably a low-melting wax is first saturated with a reactive hydrocarbon of this invention and then coated on the imaging layer. For storage purposes the manifold sandwich is kept sealed so as to prevent the premature oxidation of the reactive hydrocarbon.

DESCRIPTION OF THE DRAWINGS

The advantage of this invention will become apparent upon consideration of the detailed disclosure of the invention especially when taken in conjunction with the accompanying drawings wherein:

Referring now to FIG. 1, imaging layer 2 comprising photosensitive particles 4 dispersed in binder 3 is deposited on an insulating donor sheet 5. The image receiving portion of the manifold set comprises an insulating receiver sheet 6. Sheets 5 and 6 are preferably insulating materials so that they will hold a charge placed on their surface.

Referring now to FIG. 2, the first step in the imaging process is the activation step. Although the activator may be applied by any suitable technique such as with a brush, with a smooth or rough surfaced roller, by flow coating, by vapor condensation or the like, FIG. 2 which diagrammatically illustrates the process steps of this invention shows the activator fluid 23 being sprayed onto image layer 12 of the manifold set from a container 24. Following the deposition of this activator fluid the set is closed by a roller 26 which also serves to squeeze out any excess activator fluid which may have been deposited. The activator lowers the cohesive strength of imaging layer 12.

Once the proper physical properties have been imparted to imaging layer 12 and the receiving sheet 16 has been placed on layer 12, an electrical field is applied across the manifold set through electrodes 18 and 21 which are connected to potential source 28 and resistor 30. Although FIG. 2 shows the manifold sandwich not coming in contact with either electrode 18 or 21 since the receiver sheet and the donor sheet are preferably insulating materials, they may contact one or both electrodes during the charging operation. Preferably, the sandwich will contact one electrode to serve as a guide and be spaced one to three mils from the other electrode to prevent binding.

Figure 1:
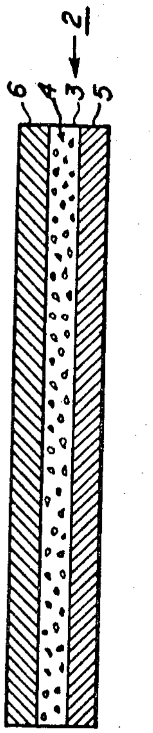
FIG. 1 is a side sectional view of a manifold sandwich for use in the invention.
Figure 2:
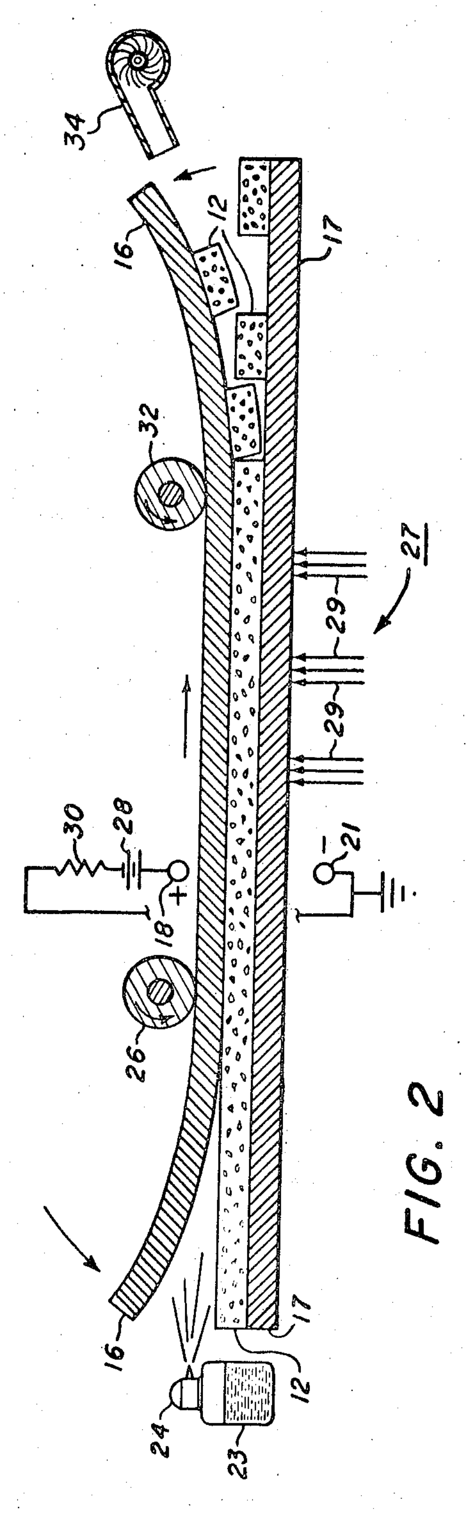
FIG. 2 is a side sectional view diagrammatically illustrating the process steps of this invention.

Alternatively, the charging electrode may be a corona discharge, a roller, roller 26 could be conductive, for example, and be used to charge in place of electrode 18, a sharp edge or a friction charging device such as a fur covered roller.

The sign of the charge as shown on electrodes 18 and 21 may also be reversed, electrode 18 being made the negative electrode and electrode 21 being made the positive electrode, The charge bearing manifold set then moves on to imaging station 27 where it is exposed to light image 29. Light image 29 may be light projected through a transparency or light information projected from an opaque subject. In a continuous operation the light image preferably is projected through a slit in such manner that there is little or no relative movement between the projected light image and the manifold set. The manifold sandwich then passes roller 32 which acts as a guide for the manifold sandwich and as a bearing point for the stripping apart of the receiver and donor sheets. Alternatively, roller 32 may be a sharp edge, a rod, or wire. Upon separation of substrate 17 and receiving sheet 16 imaging layer 12 fractures along the edges of exposed areas and at the surface where it had adhered to substrate 17. Accordingly, once separation is complete, exposed portions of imaging layer 12 are retained on one of sheets 17 and 16 while unexposed portions are retained on the other sheet which provide a positive image on one sheet and a negative image on the other sheet.

If desired to speed the fixative action the unsaturated hydrocarbon is heated by heating means 34 represented herein as a hot air gun which passes heated air over the image to be fixed.

DESCRIPTION OF THE PREFERRED EMBODIMENTS

The following examples further specifically illustrate the present invention. The examples below are intended to illustrate various preferred embodiments of the improved imaging method. The parts and percentages are by weight unless otherwise indicated.

EXAMPLE I

A commercial metal-free phthalocyanine is first purified by o-dichlorobenzene extraction to remove organic impurities. Since this extraction step yields the less sensitive beta crystalline form, the desired X form is obtained by dissolving about 100 grams of beta in approximately 600cc. of sulfuric acid precipitating it by pouring the solution into about 3,000cc. of ice water and washing with water to neutrality, the thus purified alpha phthalocyanine is then salt milled for 6 days and desalted by slurrying in distilled water, vacuum filtering, water washing, and finally methanol washing until the initial filtrate is clear. After vacuum drying to remove residual methanol the "X" form phthalocyanine thus produced is used to prepare the imaging layer according to the following procedure: About 5 grams of the "X" form phthalocyanine is added to about 5 grams of Algol Yellow GC, 1,2,5,6-di-(C,C'-diphenyl) thiazoleanthraquinone, C. I. No. 67300, available from General Dyestuffs, and about 2.8 grams of purified Watchung Red B, 1-(4'-methyl-5-chloroazobenzene-2'-sulfonic acid)-2-hydroxy-3-naphthoic acid, C. I. No. 15865, available from E. I. duPont de Nemours and Co. which is purified as follows: Approximately 240 grams of the Watchung Red B is slurried in about 2,400 milliliters of Sohio Odorless Solvent 3440, a mixture of kerosene fractions available from the Standard Oil Company of Ohio. The slurry is then heated to a temperature of about 65° C. and held there for about ½ hour. The slurry is then filtered through a glass sintered filter. The solids are then reslurried with petroleum ether (90° to 120° C.) available from Matheson Coleman and Bell Division of the Matheson Company, East Rutherford, N.J. and filtered through a glass sintered filter. The solids are then dried in an over at about 50° C.

About eight grams of Sunoco Microcrystalline Wax Grade 5825 having an ASTM-D-127 melting point of 151° F. available from Sunoco and about two grams Paraflint R. G., a low molecular weight paraffinic material available from the Moore & Munger Company, New York City, and about 320 milliliters of petroleum ether (90° to 120° C.) and about 40 milliliters of Sohio Odorless Solvent 3440 are placed with the pigments in a glass jar containing ½ inch flint pebbles. The mixture is then milled by revolving the glass jar at about 70 r.p.m. for about 16 hours. The mixture is then heated for approximately 2 hours at about 45° C. and allowed to cool to room termperature The mixture is then ready for coating on the donor substrate. The paste-like mixture is then coated in subdued green light on 2 mil Mylar (a polyester formed by the condensation reaction between ethylene glycol and terephthalic acid available from E. I. duPont de Nemours & Co., Inc.) with a No. 36 wire wound drawdown to produce a coating thickness when dried of approximately 7½ microns. The coating and two mil Mylar sheet is then dried in the dark at a temperature of about 33° C. for ½ hour. The coated donor is then placed on the tin oxide surface of a ⅛ inch NESA glass plate with its coating facing away from the tin oxide. A receiver sheet of aluminum coated paper is placed over the donor, with the aluminum surface in contact with the imaging layer. The receiver sheet is then lifted up and the imaging layer activated with one brush stroke of a wide camel's hair brush saturated in a solution containing 5 percent linseed oil in Sohio 3440 Odorless Solvent. The receiver sheet is then lowered back down and a roller is rolled slowly once over the closed manifold set with light pressure to remove excess solvent. The negative terminal of a 9,000 volt DC power supply is then connected to the NESA coating in series with a 5,500 megohm resistor and the positive terminal is connected to the aluminum coating and grounded. With the voltage applied, a white incandescent light is projected through the NESA glass using a 300 watt Bell and Howell Headliner Model 708 Duo Slide Projector having a piece of Trans-Positive sheet (Frosted) available from Xerox, Rochester, New York and a variable aperture placed in front of it. The distance from the projector to the imaging donor layer is approximately 60 inches. The light incident on the imaging layer is approximately 1 foot-candles. The imagewise exposure is continued for about 1.0 seconds resulting in an application of total incident energy on the imaging layer of about 1.0 foot-candle second. After exposure the receiver sheet is peeled from the set with the potential source still connected. The small amount of Sohio present evaporates after separation of the sheets yielding a pair of excellent quality images containing the linseed oil. The images are heated to 70° C. for 2 minutes resulting in fixed images on both the Mylar and aluminum coated paper.

EXAMPLE II

About 6.4 grams of the "X" form phthalocyanine prepared as in Example I, about 6.4 grams of Algol Yellow, about 8 grams of Sunoco Wax 5825, about 2 grams of Paraflint R.G., about 60 ml. ethanol and about 360 ml. of petroleum ether (90°–120° C.) are milled as in Example I for 16 hours. The paste-like mixture is then coated on a 2 mil Mylar sheet as in Example I and dried in the dark at a temperature of about 33° C. for ½ hour. The donor is placed on the tin oxide surface of a NESA glass, coated side up. The imaging layer is then activated with one brush stroke of a wide camel's hair brush saturated with linseed oil. A receiver sheet of aluminum coated paper is placed over the activated imaging layer forming the completed manifold set. The manifold set is then charged as in Example II except that the receiver side electrode is connected to the negative terminal of a potential source of 8,000 volts DC. The imaging layer is then exposed to an image as in Example II except that the exposure is continued for about 5 seconds resulting in a total exposure of 5 foot-candle second. After exposure the receiver sheet is peeled from the set with the potential source still connected. The images are heated at 100° C for 5 minutes resulting in fixed images on both the Mylar and aluminum coated paper.

EXAMPLE III

A pair of images are prepared as in Example I each having a residual charge from the imaging process. The image residing on the Mylar sheet is contacted with a sheet of 2 mil thick Tedlar having a dielectric constant of 9, and backed with a conductive metal layer. The Mylar has a dielectric constant of 3.25. A conductive rubber sheet is laid over the Mylar and electrical contact is made between the rubber sheet and the conductive backing of the Tedlar. The Mylar together with the conductive rubber sheet is pulled from the Tedlar leaving the image formerly residing on the Mylar now residing on the Tedlar sheet. The image on the Tedlar is then fixed by heating it to 70° C. for 2 minutes.

EXAMPLE IV

The image prepared in Example III and residing on the aluminum coated paper is contacted with a sheet of bond paper residing on a sheet of polystyrene which has been charged by passing it between a pair of charged rollers at a potential of 9,000 volts. The charged polystyrene, in turn, is residing upon an aluminum sheet with the positively charged side facing the aluminum sheet. The aluminum side of the image bearing aluminum coated paper is electrically interconnected with the aluminum sheet under the polystyrene by means of a 14 gauge copper wire. The image bearing medium is then separated from the bond paper leaving the image adhering to the paper. The image is exposed to the atmosphere at normal room temperature whereby a film is formed over the image and paper resulting from the oxidative crosslinking of the linseed oil.

It will be appreciated that the practice of this invention while employing thermo-solvents describe in my aforementioned U.S. Pat. No. 3,598,581 enables the consecutive activition and fixing of the images produced since heat in minor amounts is available in the imaging process for purposes of activation. Such activating heat is sufficient to allow the imaging process to proceed to completion prior to film formation caused by the heating of the unsaturated hydrocarbons of this invention get aids in such film formation subsequent to image formation. Proper choice of materials renders the combined processes of this invention with said prior process highly convenient for image formation and fixing.

Although specific components and proportions have been stated above, other typical materials as listed above if suitable may be used with similar results. In addition, other materials may be added to the mixture to synergize, enhance, or otherwise modify the properties of the imaging layer. For example, various dyes, spectral sensitizers or electrical sensitizers such as Lewis acid may be added to the several layers.

Other modifications and ramifications of the present invention will occur to those skilled in the art upon a reading of the present disclosure. These are intended to be included within the scope of this invention.

What is claimed is:

1. A method of imaging comprising:

a. providing an electrically photosensitive imaging layer residing on a substrate;

b. activating said imaging layer by applying thereto an activating amount of an activator having at least one component comprising a hydrocarbon having a concentration of reactive unsaturated sites whereby it can be oxidized to form a film;

c. sandwiching said imaging layer between said donor sheet and a receiver sheet;

d. subjecting said imaging layer to an electric field;

e. exposing said imaging layer to electromagnetic radiation to which said imaging layer is sensitive;

f. separating said donor and receiver sheet while said imaging layer is under said field whereby said imaging layer fractures in imagewise configuration providing a positive image on one of said donor and receiver sheets in a negative image on the other sheet, and;

g. oxidizing said hydrocarbon whereby a protective fixative film is formed on said image.

2. The method of claim 1 wherein the activator comprises at least one hydrocarbon having a concentration of reactive unsaturation held in a liquid medium, said medium being selected from the group consisting of solvents, partial solvents, swelling and softening agents for said imaging layer.

3. The method of claim 2 wherein said activator comprises at least a partial solvent for said imaging layer.

4. The method of claim 2 wherein the unsaturated hydrocarbon is soluble in said activator.

5. The method of claim 2 wherein the unsaturated hydrocarbon is dispersed in said activator.

6. The method of claim 1 wherein said unsaturated hydrocarbon is selected from the group consisting of partial solvents softening and swelling agents for said imaging layer.

7. The method of claim 1 wherein said hydrocarbon comprises linseed oil.

8. The method of claim 2 wherein the saturated hydrocarbon comprises linseed oil.

9 The method of claim 1 wherein the unsaturated hydrocarbon is oxidized at least in part by the application of heat thereto.

10. An imaging method comprising;

a. providing an electrically photosensitive imaging layer sandwiched between a donor sheet and a receiver sheet, at least one of said sheets being at least partially transparent to electromagnetic radiation to which said imaging layer is sensitive;

b. activating said imaging layer by applying thereto an activating amount of an activator at least one component of which is a hydrocarbon having a concentration of reactive unsaturation whereby it can be oxidized to form a film;

c. subjecting said imaging layer to an electric field and exposing said imaging layer to electromagnetic radiation to which it is sensitive through one of said sheets;

d. separating said donor and receiver sheet whereby said imaging layer fractures in imagewise configuration providing a positive image on one of said donor and receiver sheets and a negative image on the other sheet, and;

e. oxidizing said hydrocarbon whereby protective, fixitive film is formed on said image.

11. The method of claim 1 further including the step of transferring the image from at least one of the donor and receiver sheets to a final substrate prior to oxidizing said unsaturated hydrocarbon.

12. The method of claim 2 wherein the activator is a thermo-solvent.

13. The method of claim 12 wherein the thermosolvent comprises a low melting wax saturated with said hydrocarbon having a concentration of reactive unsaturation.

14. The method of claim 1 wherein the imaging layer comprises an electrically photosensitive material dispersed in an insulating binder.

15. The method of claim 14 wherein the electrically photosensitive material is an organic material.

* * * * *